United States Patent Office 2,920,114
Patented Jan. 5, 1960

2,920,114

PREPARATION OF p-DIALKYLBENZENES

Herman S. Bloch, Skokie, Ill., assignor, by mesne assignments, to Universal Oil Products Company, Des Plaines, Ill., a corporation of Delaware No Drawing. Application September 18, 1956
Serial No. 610,654

7 Claims. (Cl. 260—666)

This invention relates to a method for the preparation of p-dialkylbenzenes and more particularly to the preparation of p-dialkylbenzenes which are suitable for oxidation to terephthalic acid.

The increased use of terephthalic acid as an intermediate in the preparation of synthetic fibers of the glycol-terephthalic type, such as those fibers known in the trade as Dacron, Terylene, etc., has increased the demand for p-xylene from which the terephthalic acid is prepared. Heretofore the separation of p-xylene from its o- and m-isomers has been relatively expensive, due to difficulties encountered in the process involving the separation of the aforementioned isomers. For example, one method of preparing p-xylene from ethylbenzene and isomers of said p-xylene is to subject the mixture of o-xylene, m-xylene, p-xylene and ethylbenzene to fractional distillation. However, inasmuch as p-xylene, m-xylene and ethylbenzene all boil within a 3° C. range of each other, separation into the various components by fractional distillation is rather difficult to accomplish.

One method of operation is to distill out the o-xylene which has a boiling point of approximately 5–6° C. above that of the other three components of the mixture. The p- and m-xylene along with the ethylbenzene will then be separated out by crystallization from cuts containing the highest percentage.

Another method of separating the p-xylene from the unwanted isomers is to displace the eutectic compositions of p- and m-xylene by the addition of a co-crystallizing agent such as carbon tetrachloride followed by cooling, the p-xylene and carbon tetrachloride thereby separating out of the mixture, and thereafter recovering said p-xylene by fractional distillation of the p-xylene-carbon tetrachloride mixture.

Still another method of recovering p-xylene is to partially sulfonate the mixture, separate the unsulfonated layer from the reaction mixture and crystallize the p-xylene from the mixture by lowering the temperature.

It is, therefore, an object of this invention to provide a novel process for obtaining p-dialkylbenzenes such as p-xylene which can thereafter be converted to terephthalic acid by oxidation.

A further object of this invention is to provide a novel process for obtaining p-dialkylbenzene starting with a cyclohexadiene and ethylene.

One embodiment of the invention is found in a process for the preparation of a p-dialkylbenzene which comprises reacting a cyclohexadiene having the formula:

in which R is a radical selected from the group consisting of hydrogen and alkyl radicals with ethylene to form a bicyclo [2.2.2]-2-octene, hydrocracking said product to form a p-dialkylcyclohexane, dehydrogenating said cyclohexane to form the corresponding p-dialkylbenzene, and recovering said product.

A specific embodiment of the invention is found in a process for the preparation of a p-dialkylbenzene which comprises reacting a cyclohexadiene having the formula:

in which R is a radical selected from the group consisting of hydrogen and alkyl radicals with ethylene at a temperature in the range of from about 100° to about 200° C. to form a bicyclo [2.2.2]-2-octene, hydrocracking said product in the presence of hydrogen and a catalyst containing nickel at a temperature in the range of from about 200° to about 500° C. to form a p-dialkylcyclohexane, dehydrogenating said cyclohexane in the presence of a catalyst containing platinum at a temperature in the range of from about 200° to about 400° C. to form the corresponding p-dialkylbenzene, and recovering said product.

A more specific embodiment of the invention resides in a process for the preparation of p-xylene which comprises reacting 1,3-cyclohexadiene with ethylene at a temperature in the range of from about 115° to about 140° C. to form bicyclo [2.2.2]-2-octene, hydrocracking said octene in the presence of hydrogen and a catalyst containing nickel composited on a silica-alumina support at a temperature in the range of from about 200° to about 500° C. to form p-dimethylcyclohexane, dehydrogenating said cyclohexane in the presence of a catalyst containing platinum at a temperature in the range of from about 200° to about 400° C. to form p-xylene and recovering said p-xylene.

Other objects and embodiments referring to alternative cyclohexadienes will be found in the following further detailed description of the invention.

It is now proposed that certain p-dialkylbenzenes and particularly those which are readily oxidizable to terephthalic acid be prepared by a relatively simple three stage process. This process comprises the steps of first reacting a cyclohexadiene having the formula:

in which R is either a hydrogen or alkyl radical with ethylene to form a bicyclo [2.2.2]-2-octene according to the equation:

I

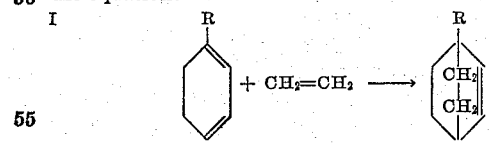

In addition to ethylene, propylene or a butene may be used, altho the yields are in general poorer with the higher olefins and ethylene is therefore preferred.

The second step consists in catalytically hydrocracking the bicyclooctene in the presence of hydrogen and a hydrocracking catalyst to form a p-dialkylcyclohexane. This is illustrated by the following equation:

II

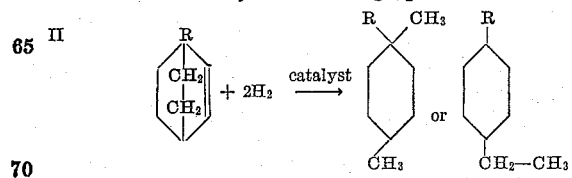

The third and final step is the dehydrogenation of the thus formed p-dialkylcyclohexane to form the corresponding p-dialkylbenzene according to the following equations:

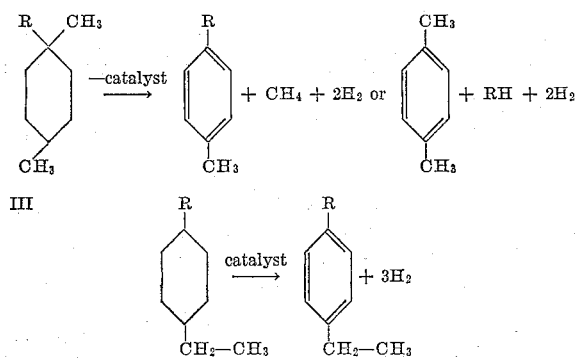

III

In the above equations where R represents an alkyl radical it is preferred that said radical is either a methyl or ethyl radical, although isopropyl radicals may also be used. Compounds of the type

in which R and R' are independently selected from these alkyl radicals may also be employed with analogous results, although they are less desirable than the monosubstituted cyclohexadienes previously discussed. Thus the preferred starting material of the present invention comprises either 1,3-cyclohexadiene, 1-methyl-1,3-cyclohexadiene, or 1-ethyl-1,3-cyclohexadiene, although other alkyl substituted 1,3-cyclohexadienes may be used, but not necessarily with equivalent results. Step one of the process of the present invention is a thermal condensation and will take place at temperatures in the range of from about 100° to about 200° C. or more, and preferably at a temperature in the range of from about 115° to about 140° C.

Step two of the present invention, as characterized by Equation II above, is carried out under a hydrogen pressure of from about 25 to about 1500 p.s.i. or more, and in the presence of a hydrocracking catalyst at a temperature in the range of from about 200° to about 500° C. The hydrocracking catalyst which may be used in this invention includes nickel, platinum, palladium, etc., preferably disposed on a support having controlled acidity, such as silica-alumina, alumina with or without a halide such as fluorine or chlorine, etc. The support and catalyst composite, for best results, have only slight acidity, since if the acidity is too high isomerization of the primary hydrocracking product (the p-dialkylcyclohexane) to undesirable isomers may occur.

The dehydrogenation step of the present process as illustrated by Equation III above is also carried out at an elevated temperature, preferably in the range of from about 200° to about 400° C. and at a relatively low pressure, preferably atmospheric. The dehydrogenation of the p-dialkylhexane is carried out in the presence of dehydrogenation catalyst such as the metals of group VIII of the periodic table including nickel, platinum, palladium, osmium, iridium, etc., composited on a suitable support such as alumina; of the group VIII metals, the noble metals are preferred. In addition other dehydrogenation catalysts include alumina or other satisfactory carriers composited with a compound and particularly an oxide of the elements in the left-hand columns of groups IV, V and VI of the periodic table, or mixtures thereof, and more particularly alumina-chromia, alumina-molybdena, alumina-zirconia, etc. may be used. In the dehydrogenation step it is to be noted that temperatures in the lower range hereinbefore stated, that is, from about 200° to about 325° C. are used when the cyclohexane to be dehydrogenated comprises a simple p-dialkylcyclohexane such as p-dimethylcyclohexane, p-methylethylcyclohexane, or p-diethylcyclohexane, while temperatures in the higher range, that is, from about 325° to about 400° C. are required when gem-dialkyl compounds such as 1,1,4-trimethylcyclohexane are to be dehydrogenated.

The process of this invention may be effected in any suitable manner and may comprise either a batch or a continuous type operation. For example, when a batch type operation is used, a quantity of the desired cyclohexadiene is placed in an appropriate condensation flask. The flask is sealed and ethylene is charged thereto while said flask is heated to a temperature in the range of from about 100° to about 200° C. At the end of the desired residence time the flask and contents thereof are cooled to room temperature and the desired reaction product comprising a bicyclo[2.2.2]-2-octene is separated from unreacted cyclohexadiene by conventional means such as fractional distillation, crystallization, etc. The above mentioned bicyclo[2.2.2]-2-octene is then placed in the same flask or, if so desired, in a second flask with the hydrocracking catalyst which has previously been selected. The flask is sealed and hydrogen pressured in until a predetermined pressure has been reached, meanwhile heating said flask to a temperature in the range of from about 200° to about 500° C. At the end of the desired reaction time the p-dialkylcyclohexane which is the desired reaction product is separated from unreacted bicyclo[2.2.2]-2-octene, the catalyst and any side products such as bicyclo[2.2.2]-octane which may have been formed during the reaction time by conventional means hereinbefore set forth.

The aforesaid p-dialkylcyclohexane is then returned to the same flask or, if so desired, a third flask where it undergoes dehydrogenation in the presence of a dehydrogenation catalyst at a temperature in the range of from about 200° to about 400° C. At the end of the desired residence time the flask and contents thereof are cooled to room temperature again and the reaction product comprising a p-dialkylbenzene is again separated by conventional means from any unreacted starting material, catalyst and/or side reaction products which may have been formed.

Another and preferred type of operation comprises a continuous type in which the cyclohexadiene and ethylene are continuously charged to a reactor maintained at the proper operating conditions of temperature and pressure. The cyclohexadiene and ethylene are charged to said reactor through separate lines, or if so desired, may be admixed prior to entry into said reactor and charged thereto in a single line. The resulting bicyclo[2.2.2]-2-octene is continuously withdrawn, separated from reactor effluent and continuously charged to a second reactor also maintained at the proper operating conditions of temperature and pressure, said second reactor containing a hydrocracking catalyst such as nickel composited on a silica-alumina support or platinum composited on a halided alumina support. Hydrogen is continuously charged to a second reactor through separate means or, if so desired, may be admixed with a bicyclo[2.2.2.]-2-octene at a point prior to the admission of said bicyclooctene into said second reactor.

The resulting p-dialkylcyclohexane is also continuously withdrawn from the second reactor, separated from reactor effluent, and continuously charged to a third reactor which contains the dehydrogenation catalyst. This third reactor, like the first two reactors, is also maintained at the proper operating conditions of temperature and pressure. The desired reaction products, comprising p-dialkylbenzenes, are continuously withdrawn from the third reactor and separated from the reactor effluent by conventional means. In all cases portions of the reactor effluents from reactors 1, 2 and 3 may be recycled to the respective reactors to form part of the feed stock. A preferred method of the continuous type of operation in the present invention comprises a fixed bed type in which the hydrocracking catalyst and the dehydrogenation catalyst which are in reactors 2 and 3 respectively are maintained in a fixed bed while the starting materials are passed therethrough in either an upward or downward flow. It is also contemplated within the scope of this invention that other forms of continuous type operation such as the slurry type in which the catalyst is charged to the respective reactors as a slurry in the feed materials may also be used.

The p-dialkylbenzenes which are the desired reaction products of this invention may then be oxidized to the respective aromatic dicarboxylic acids by any means known in the art, thus forming, as in the case of p-xylene, terephthalic acid which may be used in any of the processes hereinbefore set forth.

The following example is given to illustrate the process of the present invention which, however, is not intended to limit the generally broad scope of the present invention in strict accordance therewith.

*Example I*

80 g. of 1,3-cyclohexadiene are placed in a condensation flask provided with heating and stirring means. The flask is sealed and 56 g. of ethylene charged thereto while said flask is heated to a temperature of approximately 120–125° C. The flask is maintained at this temperature for a period of approximately four hours, at the end of which time the flask and contents thereof are cooled to room temperature. The seal is broken, the excess ethylene is vented and the reaction product comprising bicyclo[2.2.2]-2-octene is separated from unreacted 1,3-cyclohexadiene and other products, washed, dried and subjected to fractioned distillation.

54 g. of bicyclo[2.2.2]-2-octene are placed in a second condensation flask along with 5 g. of a catalyst comprising nickel composited on a silica-alumina support, said flask being provided with means for introducing hydrogen thereto. The flask is sealed and heated to a temperature of approximately 325° C. while charging hydrogen thereto until a pressure of approximately 1000 p.s.i. of hydrogen has been reached. The flask is maintained at this temperature for a period of approximately three hours, at the end of which time the flask and contents thereof are cooled to room temperature, the excess gases vented and the desired product, comprising p-dimethylcyclohexane is separated from unreacted bicyclo[2.2.2]-2-octene, bicyclooctane, and other by-products.

24 g. of p-dimethylcyclohexane are placed in a condensation flask along with 2 g. of a catalyst comprising platinized-alumina containing 0.5% platinum. The flask is heated to a temperature of about 280–285° C. and maintained thereat for a period of time of about four hours. At the end of this time the flask and contents thereof are cooled to room temperature and the reaction product is separated from the catalyst layer. This product is then subjected to fractional distillation. The cut boiling in the range of from about 135–140° C., comprises p-xylene.

I claim as my invention:

1. A process for the preparation of a p-dialkylcyclohexane which comprises hydrocracking a bicyclo[2.2.2]-2-octene in the presence of hydrogen and a cracking catalyst at a temperature of from about 200° C. to about 500° C.

2. A process for the preparation of a p-dialkylcyclohexane which comprises hydrocracking a bicyclo[2.2.2]-2-octene in the presence of hydrogen and a nickel-containing catalyst at a temperature of from about 200° C. to about 500° C.

3. A process for the preparation of a p-dialkylcyclohexane which comprises hydrocracking a bicyclo[2.2.2]-2-octene at a temperature of from about 200° C. to about 500° C. in the presence of hydrogen and a catalyst comprising platinum composited with a halided alumina support.

4. A process for the preparation of p-dimethylcyclohexane which comprises hydrocracking bicyclo[2.2.2]-2-octene in the presence of hydrogen and a cracking catalyst at a temperature of from about 200° C. to about 500° C.

5. The process of claim 4 further characterized in that said catalyst comprises nickel composited with a silica-alumina support.

6. A process for the preparation of 1-methyl-4-ethylcyclohexane which comprises hydrocracking 1-methylbicyclo[2.2.2]-2-octene at a temperature of from about 200° C. to about 500° C. in the presence of hydrogen and a catalyst comprising platinum composited with a halided alumina support.

7. A process for the preparation of a p-dialkylcyclohexane which comprises hydrocracking an alkylbicyclo[2.2.2]-2-octene in the presence of hydrogen and a cracking catalyst at a temperature of from about 200° C. to about 500° C.

References Cited in the file of this patent

UNITED STATES PATENTS 2,394,691     Ipatieff et al.     Feb. 12, 1946
2,496,253     Purcell et al.     Jan. 31, 1950

OTHER REFERENCES

Calingaert et al.: Ind. and Engr. Chem., vol. 36, No. 11, 1944, pages 1055–6.

Greensfelder et al.: Ind. and Engr. Chem., vol. 37, No. 11, 1945, pages 1038–1043.

Walborsky et al.: Jour. Amer. Chem. Soc., vol. 76, Nov. 5, 1954, pages 5396–5399.